United States Patent [19]

Blomberg et al.

[11] 4,138,165

[45] Feb. 6, 1979

[54] BRAKE ANTI-LOCKING MODULATOR WITH REAPPLICATION CONTROL

[76] Inventors: Folke I. Blomberg, Duvstigen 4, S-181 40 Lidingo; Jan-Olov M. Holst, Skogsduvevagen 14, S-75252 Uppsala; Torbjorn Nordstrom, Skarpbrunnaväg 351, 145 64 Norsborg, all of Sweden

[21] Appl. No.: 795,539

[22] Filed: May 10, 1977

[51] Int. Cl.² .............................................. B60T 13/68
[52] U.S. Cl. ...................................... 303/115; 303/61; 303/119
[58] Field of Search .............. 137/601, 614.11, 630.15, 137/513.3; 303/115–119, 61

[56] References Cited

U.S. PATENT DOCUMENTS

| | | | |
|---|---|---|---|
| 3,731,980 | 5/1973 | Fink et al. | 303/119 |
| 3,752,537 | 8/1973 | Ochiai | 303/115 |
| 3,823,987 | 7/1974 | Kurichh | 303/118 |
| 3,836,207 | 9/1974 | Belart | 303/115 |
| 4,035,034 | 7/1977 | Sekiguchi | 303/115 |
| 4,068,904 | 1/1978 | Blomberg et al. | 303/116 X |

*Primary Examiner*—Stephen G. Kunin
*Attorney, Agent, or Firm*—Bell, Seltzer, Park & Gibson

[57] ABSTRACT

A modulator apparatus for use in a rotating member braking arrangement which has a fluid pressure responsive brake to which pressurized fluid is supplied for braking the rotating member, with the anti-locking modulator interposed between the brake and the source of supply of fluid pressure for cyclically decreasing and increasing the fluid pressure supplied to the brake. The modulator valving is constructed in such a way as to control the rate of rise of fluid pressure applied to the brake, thereby governing reapplication of braking forces by the brake and aiding in optimizing brake performance.

3 Claims, 3 Drawing Figures

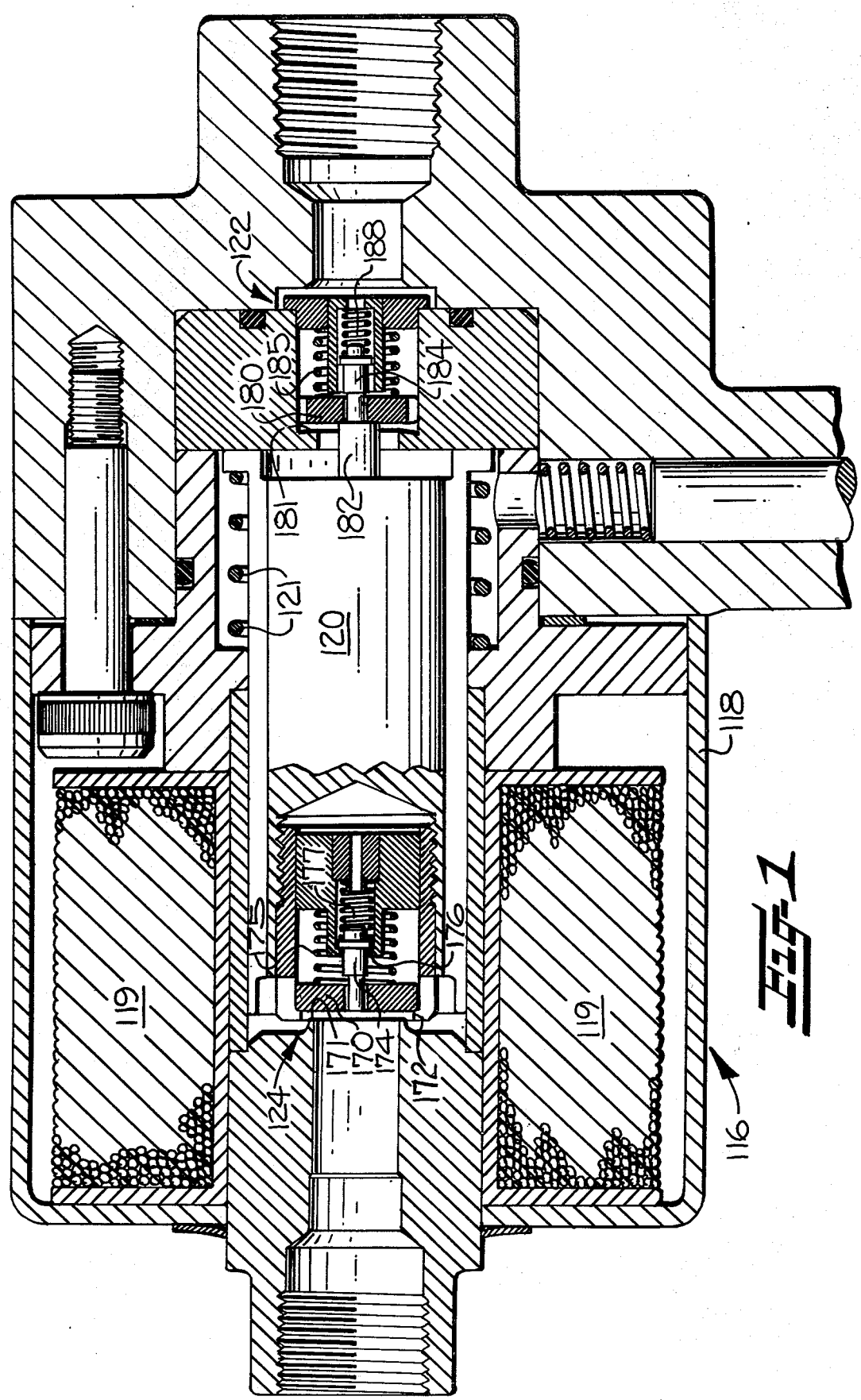

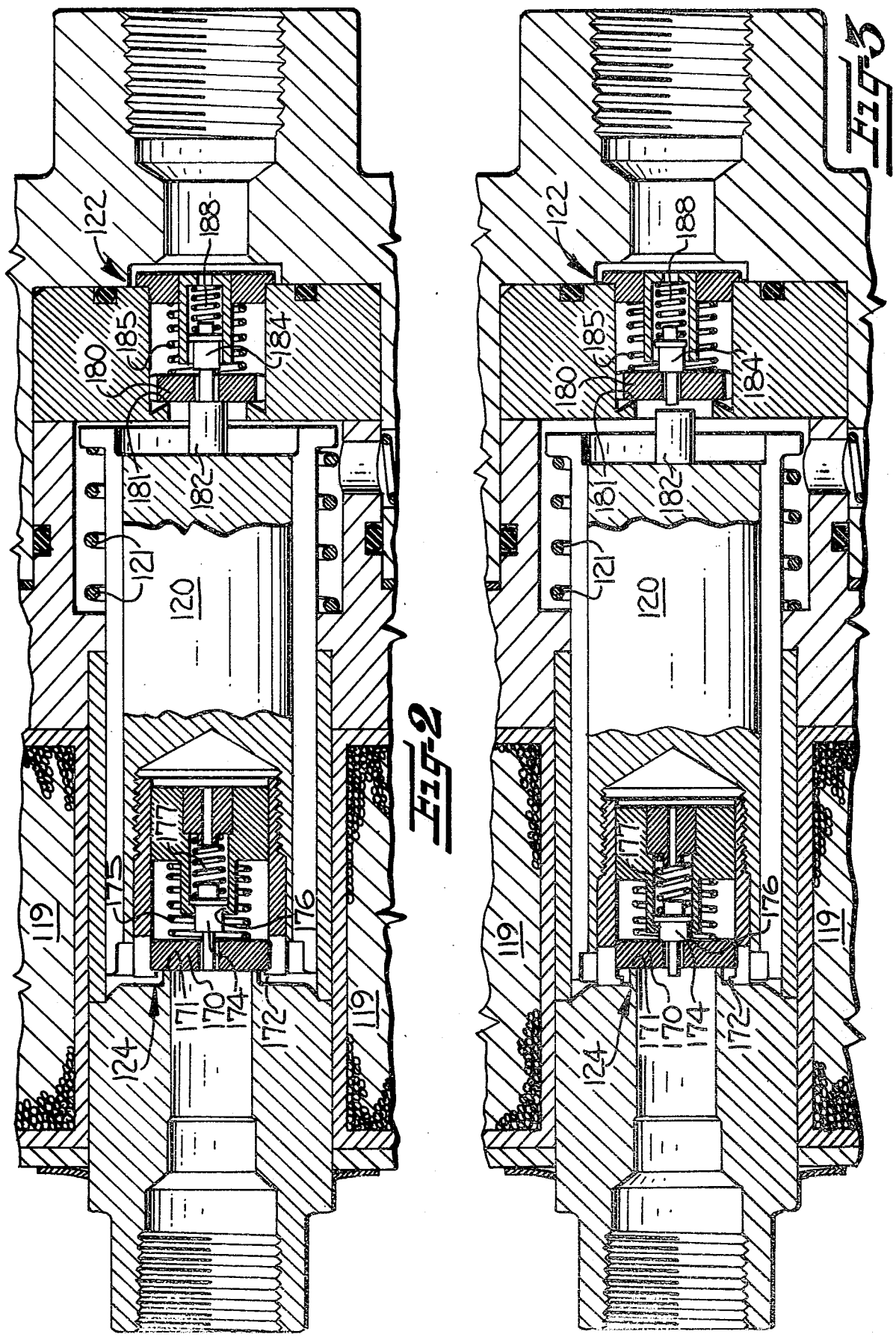

BRAKE ANTI-LOCKING MODULATOR WITH REAPPLICATION CONTROL

It has long been known to brake a rotating member through the use of a fluid pressure actuated brake cylinder which exerts braking force. Conventionally, as in an automotive vehicle such as a truck or passenger car, a reservoir is provided for supplying fluid to a braking system which includes a plurality of cylinders and conduits establishing operative communication between the cylinders and the reservoir. In a typical hydraulic fluid braking arrangement, a master cylinder is employed for pressurizing hydraulic fluid actuating the brake cylinders.

Substantial recent attention has been given to the development and incorporation of anti-locking devices into such fluid pressure actuated brake systems. Particularly in connection with braking a wheel of an automotive vehicle, it is known that application of force by a driver to a master cylinder or the like will lead to a rise of fluid pressure supplied to the brake cylinders, with resultant exertion of force braking rotation of the vehicle wheel. In order to avoid dangerous locking tendencies which may occur in connection with excessively heavy braking on surfaces having low coefficients of friction, anti-lock devices have been proposed and incorporated into vehicle brake systems to block an additional increase of pressure at the brake cylinders and relieve the applied pressures which lead to the tendency of the vehicle to lock. At least certain anti-locking devices simulate a "pumping" technique known to and used by skilled drivers, by which a cyclically decreasing and increasing fluid pressure is applied through the brake system conduits to the brake cylinders.

With such "pumping" anti-locking devices, the possibility exists that each cyclic increase in fluid pressure will restore the pressure at the brake cylinder to the system pressure, thereby requiring the anti-locking device or brake modulator to cyclically decrease pressure from the maximum pressure of the braking circuit. Such demands on an anti-locking device or brake modulator are undesirable, as imposing a requirement that the device or modulator have sufficient pressure relieving capacity for lowering the brake cylinder pressure in each cycle from the circuit pressure to a pressure sufficiently low to relieve the locking tendency for the braked member or wheel so that the vehicle wheel may again accelerate. This difficulty having been recognized, it has been proposed to control and limit the rate of rise of cyclically increasing fluid pressure in a brake system, so that the pressure relieving components of an anti-locking device or brake modulator do not have to lower a braking pressure from the maximum pressure level of the remainder of a braking system but may operate from a lower pressure level.

Having in mind the aforementioned developments, it is an object of this invention to incorporate directly into a brake modulator device valve arrangements accomplishing control over rates of rise of brake fluid pressure. In realizing this object of the present invention, a particularly advantageous arrangement is achieved in that space and power requirements are optimized while broad usefulness of any specific modulator is facilitated by greater enablement of the modulator to function correctly in braking arrangements of varying capacities and response times.

One object of the invention having been stated, other objects will appear as the description proceeds when taken in connection with the accompanying drawings, in which—

FIG. 1 is an elevation view, partially in section, illustrating a modulator apparatus in accordance with this invention;

FIG. 2 is a view similar to a portion of FIG. 1, illustrating one operating condition of the apparatus of FIG. 1; and FIG. 3 is a view similar to FIG. 2 illustrating another operating condition of the apparatus of FIG. 1.

While the present invention will be described more fully hereinafter with reference to the accompanying drawings, it is to be understood at the outset of the detailed description of this invention that it is contemplated that various modifications of the invention as described may be made by persons skilled in the appropriate arts. For that reason, the detailed description is to be read broadly, and not as limiting on the scope of this invention.

A brake system of the type which will incorporate a modulator in accordance with the present invention typically includes fluid pressure responsive braking means having a brake cylinder means for exerting force braking rotation of a rotating member, more particularly a vehicle wheel. Fluid pressure for braking the wheel may be supplied, for example, from a hydraulic master cylinder and be transmitted through a conduit means which establishes operative communication between the cylinder of the brake means and a reservoir provided by the master cylinder. A sensor means is provided for detecting the rate of retardation of rotation of the wheel and for signalling the occurrence of a rate of retardation in excess of a predetermined rate. Persons knowledgable in the arts relating to anti-locking brake control systems will be aware of sensor means which are known to be suitable for detecting wheel slip or the rate of retardation of a braked rotating member and for signalling electrically and otherwise the occurrence of excessive wheel slip or a rate of retardation in excess of a predetermined rate. A selected one of such sensors is, in accordance with the present invention, operatively connected with the rotating member to be braked, such as the wheel, and is connected to electrically signal an anti-locking means generally indicated at 116. The anti-locking means 116, also known as a brake modulator, operates in response to the sensor means 15 generally as described in co-pending application Ser. No. 657,762, now U.S. Pat. No. 4,068,094 and interested readers are directed to that application for a more complete description and explanation of the brake modulator.

As there pointed out, in normal braking operation, hydraulic fluid may freely flow in both directions through the conduit means and through a housing 118 of the brake modulator 116. Thus, normal braking action may occur with pressurization of fluid by the master cylinder and resultant actuation of a wheel cylinder incorporated in the brake means. However, should the sensor means electrically signal wheel slip or an excessive rate of retardation of a braked rotating member, a winding 119 within the housing 118 is energized and an armature 120 is displaced (to the left in FIG. 1) against the action of a return spring 121. Such displacement of the armature 120 results in substantially simultaneous closing of first and second controllable one-way valve means, respectively generally indicated at 122 and 124 as described more fully hereinafter. With such closing of the valves 122, 124, the valves are conditioned for blocking passage of flow from the master cylinder to the wheel cylinder through the housing 118, so that any further increase in pressure buildup in the wheel cylinder is prevented.

In accordance with the present invention, at least one of the controllable valves 122, 124 incorporates valve structure capable of controlling the rate of rise of increasing fluid pressure. In the form shown, both valves have such structure. More particularly, and with reference to the downstream controllable valve 124, a washer or disc valve member 170 is normally kept from a cooperating seat 171 by engagement thereof with shoulders 172 formed on the armature 120. The normal spacing between the disc valve member 170 and its cooperating seat 171 is a first predetermined distance, on the order of 0.5 mm.

A central seal element 174 penetrates and cooperates with the valve disc member 170. Normally, the cooperation of the seal element 174 and the valve disc 170 is such as to permit fluid flow through restricted areas defined between the portion of the seal element 174 which penetrates the disc 170 and a central opening or hole in the valve disc member 170. However, the seal element 174 is capable of seating against the valve disc member 170 in a sealing manner. The valve disc member 170 is normally biased against its retaining shoulder 172 by an actuating spring 175, while the seal element 174 is similarly biased against retaining shoulders 176 by an actuating spring 177. The seal element 174 and the shoulders 176 therefore are dimensioned and disposed relative to the valve disc member 170 and its cooperating seat 171 in such a manner that over travel of the armature 120 beyond the position at which the disc 170 is seated is necessary in order to seat the seal element 174 against the disc 170. Typically, such over travel may be on the order 0.5 mm beyond the position at which the disc 170 is seated upon its cooperating seat 171.

The upstream controlled one-way valve 122 is similarly constructed with a valve disc member 180, a cooperating seat 181, a seal element 184 and biasing springs 185 and 188. However, these valve elements are operated by a protrusion 182 from the armature 120 rather than by shoulder portions.

Under normal braking conditions, with the winding 119 not energized, hydraulic braking fluid flows freely through the housing 118 and the controllable valves 122, 124. Upon energization of the winding 119 by a retardation sensor, the armature 120 shifts (to the left in FIG. 1) to successively bring about seating of the disc valve members 170, 180 on their respective seats 171, 181 (see FIG. 2) followed by seating of the sealing members 174, 184 against the disc valve members 170, 180 (see FIG. 3). With the controllable valves 122, 124 thus blocking continued fluid flow from a master cylinder to a wheel cylinder, cyclic decreasing and increasing of pressure applied to the wheel cylinder occurs as has been described hereinabove.

Upon the winding 119 again being de-energized, the armature 120 shifts (to the right in FIG. 1) under the combined force of the return spring 121, the downstream disc return spring 175 and the downstream sealing member return spring 177 toward the normal position. However, the force of those springs is balanced against a force resulting from any pressure differential across the housing 118 and acting on the area of the disc valve members 170, 180. In the event that such pressure differential is sufficiently high, the force of the return springs is incapable of overcoming the pressure forces and only the sealing members 174, 184 are unseated, with the controllable valves moving to the position of FIG. 2. With only the sealing members 174, 184 unseated, only a restricted flow path through the housing 118 is opened, until such time as the pressure differential diminishes to a more normal range. Upon the pressure differential diminishing, the armature 120 completes its stroke in returning to the normal position, the disc valve members 170, 180 are unseated and the valving of the anti-lock means is fully opened to allow full flow of fluid.

In addition to the reapplication control function of the valves 122, 124, the differentials between seating areas of the sealing members 174, 184 and the disc valve members 170, 180 permit two-stage valve operation during modulation of braking pressures. That is, the force required from the armature 120 for unseating the two-stage valving is less than the force which would be required should only the disc valve members be used. Thus, proper operation under conditions of high differential pressures across the modulator 116 is made more readily accomplishable.

In the drawings and specifications, there has been set forth a preferred embodiment of the invention, and although specific terms are employed, they are used in a generic and descriptive sense only and not for purposes of limitation.

That which is claimed is:

1. Apparatus for braking a vehicle wheel comprising hydraulic fluid responsive braking means for braking a wheel, hydraulic fluid conduit means connected to said braking means, means operatively communicating with said conduit means for applying there through hydraulic fluid pressure for braking the wheel, first and second controllable one-way valve means in series flow relation in said conduit means and defining there between a controlled conduit portion, each of said valve means having a valve member for permitting relatively large volume rates of flow and a seal element cooperating with said valve member for accommodating relatively small volume rates of flow, valve actuator means operatively coupled to said valve means for normally conditioning said valve means for free flow of fluid therethrough and operable for controllably conditioning said valve means to close said valve means against flow of fluid therethrough toward said braking means, said valve means and said valve actuator means cooperating when there are high pressure differentials across said valve means for sequentially opening first said seal elements and then said valve members and thereby facilitating reduction in forces required for valve means actuation, expansible chamber means operatively communicating with said controlled conduit portion for intermittently expanding and contracting the volume thereof, and sensor means responsive to braking of the wheel and operatively connected to said valve actuator means and said expansible chamber means for operating said means to modulate hydraulic fluid pressure.

2. A modulator according to claim 1 wherein both of said valve means are operative for controlling the rate of rise of increasing fluid pressure applied through said modulator.

3. A modulator according to claim 1 wherein at least one of said valve means is operative for controlling the rate of rise of increasing fluid pressure applied through said modulator.

* * * * *

UNITED STATES PATENT AND TRADEMARK OFFICE
CERTIFICATE OF CORRECTION

PATENT NO. : 4,138,165

DATED : February 6, 1979

INVENTOR(S) : Folke I. Blomberg, et al

It is certified that error appears in the above-identified patent and that said Letters Patent are hereby corrected as shown below:

Column 2, Line 48 "4,068,094" should be 4,068,904

Signed and Sealed this

Thirteenth Day of May 1980

[SEAL]

Attest:

SIDNEY A. DIAMOND

Attesting Officer     Commissioner of Patents and Trademarks